(12) United States Patent
Carroll (10) Patent No.: US 7,260,216 B2
(45) Date of Patent: Aug. 21, 2007

(54) STATE MACHINE REPRESENTATION FOR ENCRYPTING AND DECRYPTING A SET OF DATA VALUES AND METHOD FOR PROTECTING THE SAME

(75) Inventor: Dennis J. Carroll, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 10/644,446

(22) Filed: Aug. 20, 2003

(65) Prior Publication Data

US 2005/0041801 A1    Feb. 24, 2005

(51) Int. Cl.
*H04K 1/00*    (2006.01)
*H04L 9/00*    (2006.01)
*H04L 9/28*    (2006.01)

(52) U.S. Cl. .......................................... 380/28; 380/45
(58) Field of Classification Search ...................... None
See application file for complete search history.

(56) References Cited

U.S. PATENT DOCUMENTS

| | | | |
|---|---|---|---|
| 5,414,833 A | 5/1995 | Hershey et al. | |
| 5,737,607 A | 4/1998 | Hamilton et al. | |
| 5,841,872 A | 11/1998 | Colvin, Sr. | |
| 5,987,572 A | 11/1999 | Weidner et al. | |
| 2002/0037079 A1 | 3/2002 | Duval | |

FOREIGN PATENT DOCUMENTS

| EP | 1 098 248 A1 | 5/2001 |
|---|---|---|
| WO | WO 01/47177 A1 | 6/2001 |

OTHER PUBLICATIONS

Randy Katz, Contemporary Logic Design, 1994, The Benjamin/Cummings Publishing Company, p. 387.*

(Continued)

*Primary Examiner*—Gilberto Barron
*Assistant Examiner*—Benjamin E. Lanier
(74) *Attorney, Agent, or Firm*—William E. Schiesser; Hoffman, Warnick & D'Alessandro LLC (57) ABSTRACT

A state machine representation is provided that includes a plurality of nodes that are assigned a unique node identifier and an output value, and that are grouped into color segments. The nodes are interconnected by transitional vectors, with each transitional vector being assigned a unique value. Further, at least one of the nodes has a termination vector that leads to a termination point. To encrypt the set of data values, a start node is identified and any path of transitional vectors is be traversed from node to node. As each transitional vector is traversed, its corresponding unique value will be recorded in sequence. When a node is reached that has an output value that matches one of the set of data values, an invalid unique value is designated and recorded in sequence with the unique values.

42 Claims, 4 Drawing Sheets

OTHER PUBLICATIONS

Development Practical Ideas for Improving Productivity and Quality, "Testing vs. Cleanroom: The Software Methods Controversy", By Nicholas Zvegintzov, Apr. 1996, pp. 4-6.

IBM Research Disclosure 41992, "Password Protection Using DES Security", Mar. 1999, p. 393.

Proceedings of the 1984 Symposium on Security and Privacy, Apr. 29-May 2, 1984, Oakland, California, Sponsored by the Technical Committee on Security and Privacy IEEE Computer Society, "Formal Verification of a Secure Network with End-To-End Encryption", By Dianne E. Britton, pp. 154-166.

"Mercy: A Fast Large Block Cipher for Disk Sector Encryption", By Paul Crowley, Date: Apr. 2000, http://www.ciphergoth.org/crypto/marcy/html/.

"A Hybrid Pipelined Path-Searching Architecture for Multiple Communications Applications", By Horng-Dar Lin and David G. Messerschmitt, pp. V-653-656, 1992.

"A Hybrid Pipelined Path-Searching Architecture for Multiple Communications Applications", By Horng-Dar Lin and David G. Messerschmitt, IEEE Transactions on Communications, vol. 44, No. 12, Dec. 1996, pp. 1640-1642.

Development Practical Ideas for Improving Productivity and Quality, "Testing vs. Cleanroom: The Software Methods Controversy", By Nicholas Zvegintzov, Apr. 1996, pp. 4-6.

IBM Research Disclosure 41992, "Password Protection Using DES Security", Mar. 1999, p. 393.

* cited by examiner

RELATED ART

STATE MACHINE REPRESENTATION FOR ENCRYPTING AND DECRYPTING A SET OF DATA VALUES AND METHOD FOR PROTECTING THE SAME

CROSS-REFERENCE TO RELATED APPLICATIONS

This application is related in some aspects to commonly owned U.S. patent application Ser. No. 10/329,234 entitled METHOD, SYSTEM, PROGRAM PRODUCT AND STATE MACHINE REPRESENTATION FOR ENCRYPTING AND DECRYPTING A MESSAGE, filed Dec. 24, 2002 and hereby incorporated by reference.

FIELD OF THE INVENTION

The present invention generally relates to a state machine representation for encrypting and/or decrypting a set of data values, and a method for protecting the same. Specifically, the present invention provides an improved state machine representation that is protected during transport between encryption and decryption points.

BACKGROUND OF THE INVENTION

As the use of computer technology grows, security in message transmission is becoming an increasing concern. Specifically, today many businesses and governments transmit information over computer networks such as the Internet. In many cases, the information transmitted is of a secretive nature. For example, a business might need to transmit valuable trade secret information from one facility to another. Further, governments might need to transmit sensitive military or strategic information to allies and forces abroad. In any of these cases, the secretive nature of the information must never be compromised.

To date, many systems for encrypting or otherwise securing data have been developed. One common methodology is to use a security key that is a pseudo-random number. The security key is used as an exclusive-OR (XOR) value against bytes in the data. Typically, the pseudo-random number is generated using a method known to both the sender and the intended recipient of the data. Once encrypted, the data is transmitted to the recipient who can then decrypt the data using a "seed" value and the pseudo-random number. Generally, a pseudo-random number generator on the sender side generates a new random number for each sequence of bytes to be encrypted. A pseudo-random number generator on the recipient side will generate the same sequence of pseudo-random numbers to decrypt the data. In methods such as these, there is a one to one correspondence of encrypted bytes to source bytes.

Typically, methods such as these creates various security risks. For example, the encryption can be broken through trial and error. Specifically, security under these methods relies upon the complexity of the pseudo-random number (i.e., the "mask"). The more bits the mask has, the longer it will take to decrypt the message. However, given the advanced nature of today's computer technology, any encrypted data set (regardless of bit quantity in the mask) can be decrypted through trial and error in a finite amount of time. In an attempt to address these issues, the above-incorporated patent application describes a state machine representation for encrypting and decrypting a message. The described state machine representation typically includes a set of nodes that are interconnected by transitional vectors, with each transitional vector being assigned a unique value. Some or all of the nodes in the state machine representation are assigned data values from the message, with each data value being assigned to at least one of the nodes. To encrypt the message, a start node will be identified and any path of transitional vectors will be traversed from node to node. As each transitional vector is traversed, its corresponding unique number will be recorded in sequence. When one of the data values in the message to be encrypted is encountered/reached at a node, a random number that is not representative of any of the transitional vectors is generated and recorded (in sequence with the unique values). This process continues until all of the data values in the message have been encountered/reached. Once complete, the recorded string of unique values and random values is outputted to a recipient who has access to a copy of the state machine representation. Using the string of values, the recipient can follow the sequence/path of transitional vectors traversed in encrypting the message to recover the data values.

As effective as the state machine representation of the incorporated patent application can be, various security risks can still be posed. Specifically, since both the encrypting party and the decrypting party must have access to the state machine representation, the state machine representation is typically distributed to both parties. During such distribution, it is possible for an intruder or other unauthorized party to intercept the state machine representation. If the intruder is also able to intercept the string of values, he/she could decrypt the message.

In view of the foregoing, there exists a need for an improved state machine representation for encrypting and decrypting a set of data values, and a method for protecting the same. In addition, a need exists for a method, system and program product for encrypting and decrypting a set of data values using the improved state machine representation. To this extent, a need exists for nodes of the state machine representation to be grouped into distinct color segments, with no two directly connected nodes being in the same color segment. A further need exists for one or more of the nodes to have a termination (transitional) vector that leads to a termination point instead of to another node.

SUMMARY OF THE INVENTION

In general, the present invention provides an improved state machine representation for encrypting and decrypting a set of data values, and a method for protecting the same. In addition, the present invention provides a method, system and program product for encrypting and decrypting the set of data values using the improved state machine representation. Under the present invention, the state machine representation includes a plurality of nodes that are assigned a unique node identifier and an output value. The nodes are interconnected by transitional vectors, with each transitional vector being assigned a unique value. Further, transitional vectors may lead to a termination point rather than an adjacent node. These types of transitional vectors are referred to herein as termination vectors. The nodes are also grouped into color segments so that no two directly connected nodes are grouped into the same color segment. To encrypt the set of data values, a start node is identified and any path of transitional vectors is traversed from node to node. As each transitional vector is traversed, its corresponding unique value is recorded in sequence. When a node is reached that has an output value that matches one of the set of data values, an invalid unique value is designated and recorded in sequence with the unique values. An invalid unique value is that which either corresponds to a transitional vector that does not exist for the node, or a termination vector that leads to a termination point. In any event, this process continues until all of the data values in the message have been encountered/reached. Once complete, the recorded string of unique values and invalid unique values is transported to a recipient. Further, the various color segments of the state machine representation are separately transported to the recipient. This makes interception of the entire state machine representation extremely difficult. Once all color segments are received, the recipient can use the string of values to decrypt the message.

A first aspect of the present invention provides an encryption state machine representation, comprising: a plurality of nodes grouped into color segments, wherein directly connected nodes of the plurality of nodes are grouped into different color segments; a set of transition vectors for interconnecting the plurality of nodes, wherein each of the set of transition vectors is assigned a unique value; and a set of termination vectors, wherein each of the set of termination vectors interconnects one of the plurality of nodes with a termination point.

A second aspect of the present invention provides a method for securing an encryption state machine representation, comprising: providing an encryption state machine representation having a plurality of nodes, wherein each of the plurality of nodes has at least one transition vector that has a unique value and that leads to another one of the plurality of nodes, and wherein the encryption state machine representation further includes a set of termination vectors that each lead from one of the plurality of nodes to a termination point; and grouping the plurality of nodes into color segments.

A third aspect of the present invention provides a method for encrypting a set of data values, comprising: providing a state machine representation having a plurality of nodes grouped into color segments, wherein each of the plurality of nodes is assigned a unique node identifier and an output value, and wherein each of the plurality of nodes has at least one transition vector having a unique value that leads to another one of the plurality of nodes; selecting a starting node and traversing along the transition vectors, recording in sequence, the unique values for the transition vectors traversed; and recording an invalid unique value upon reaching one of the plurality of nodes having an output value that matches one of the set of data values.

A fourth aspect of the present invention provides a method for decrypting a set of data values, comprising: receiving a state machine representation having a plurality of nodes grouped into color segments, wherein each of the plurality of nodes is assigned a unique node identifier and an output value, and wherein each of the plurality of nodes has at least one transition vector having a unique value that leads to another one of the plurality of nodes; receiving a string of values that includes unique values and invalid unique values as recorded in sequence during encryption of the set of data values; selecting a starting node and traversing along the transition vectors according to the unique values in the string of values; and recovering one of the set of data values by reading the output value from a current node when one of the invalid unique values is reached in the string of values.

A fifth aspect of the present invention provides a system for encrypting a set of data values, comprising: a vector system for traversing along a set of transition vectors between a plurality of nodes in a state machine representation, wherein the plurality of nodes are grouped into color segments, wherein each of the plurality of nodes is assigned a unique node identifier and an output value, and wherein each of the set of transition vectors has a unique value; a recording system for recording in sequence the unique values corresponding to the set of transition vectors traversed; and a value designation system for providing an invalid unique value when one of the plurality of nodes is reached that has an output value matching one of the set of data values, wherein the recording system further records the invalid unique values in sequence with the unique values.

A sixth aspect of the present invention provides a system for decrypting a set of data values, comprising: an input system for receiving a string of values that includes unique values and invalid unique values as recorded in sequence during encryption of the set of data values, and for receiving a state machine representation having a plurality of nodes grouped into color segments, wherein each of the plurality of nodes is assigned a unique node identifier and an output value, and wherein each of the plurality of nodes has at least one transition vector having a unique value that leads to another one of the plurality of nodes; a path system for traversing a set of the transition vectors according to the string of values; and a data value system for recovering one of the set of data values by reading the output from a current node when one of the invalid unique values in the string of values is reached.

A seventh aspect of the present invention provides a program product stored on a recordable medium for encrypting a set of data values, which when executed, comprises: program code for traversing along a set of transition vectors between a plurality of nodes in a state machine representation, wherein the plurality of nodes are grouped into color segments, wherein each of the plurality of nodes is assigned a unique node identifier and an output value, and wherein each of the set of transition vectors has a unique value; program code for recording in sequence the unique values corresponding to the set of transition vectors traversed; and program code for providing an invalid unique value when one of the plurality of nodes is reached that has an output value matching one of the set of data values, wherein the program code for recording further records the invalid unique values in sequence with the unique values.

An eighth aspect of the present invention provides a program product stored on a recordable medium for decrypting a set of data values, which when executed, comprises: program code for receiving a string of values that includes unique values and invalid unique values as recorded in sequence during encryption of the set of data values, and for receiving a state machine representation having a plurality of nodes grouped into color segments, wherein each of the plurality of nodes is assigned a unique node identifier and an output value, and wherein each of the plurality of nodes has at least one transition vector having a unique value that leads to another one of the plurality of nodes; program code for traversing a set of the transition vectors according to the string of values; and program code for recovering one of the set of data values by reading the output value from a current node when one of the invalid unique values in the string of values is reached.

Therefore, the present invention provides an improved state machine representation for encrypting and decrypting a set of data values, and a method for protecting the same. In addition, the present invention provides a method, system and program product for encrypting and decrypting the set of data values using the improved state machine representation.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides an improved state machine representation for encrypting and decrypting a set of data values, and a method for protecting the same. In addition, the present invention provides a method, system and program product for encrypting and decrypting the set of data values using the improved state machine representation. Under the present invention, the state machine representation includes a plurality of nodes that are assigned a unique node identifier and an output value. The nodes are interconnected by transitional vectors, with each transitional vector being assigned a unique value. Further, transitional vectors may lead to a termination point rather than an adjacent node. These types of transitional vectors are referred to herein as termination vectors. The nodes are also grouped into color segments so that no two directly connected nodes are grouped into the same color segment. To encrypt the set of data values, a start node is identified and any path of transitional vectors is traversed from node to node. As each transitional vector is traversed, its corresponding unique value is recorded in sequence. When a node is reached that has an output value that matches one of the set of data values, an invalid unique value is designated and recorded in sequence with the unique values. An invalid unique value is that which either corresponds to a transitional vector that does not exist for the node, or a termination vector that leads to a termination point. In any event, this process continues until all of the data values in the message have been encountered/reached. Once complete, the recorded string of unique values and invalid unique values is transported to a recipient. Further, the various color segments of the state machine representation are separately transported to the recipient. This makes interception of the entire state machine representation extremely difficult. Once all color segments are received, the recipient can use the string of values to decrypt the message.

Figure 1:
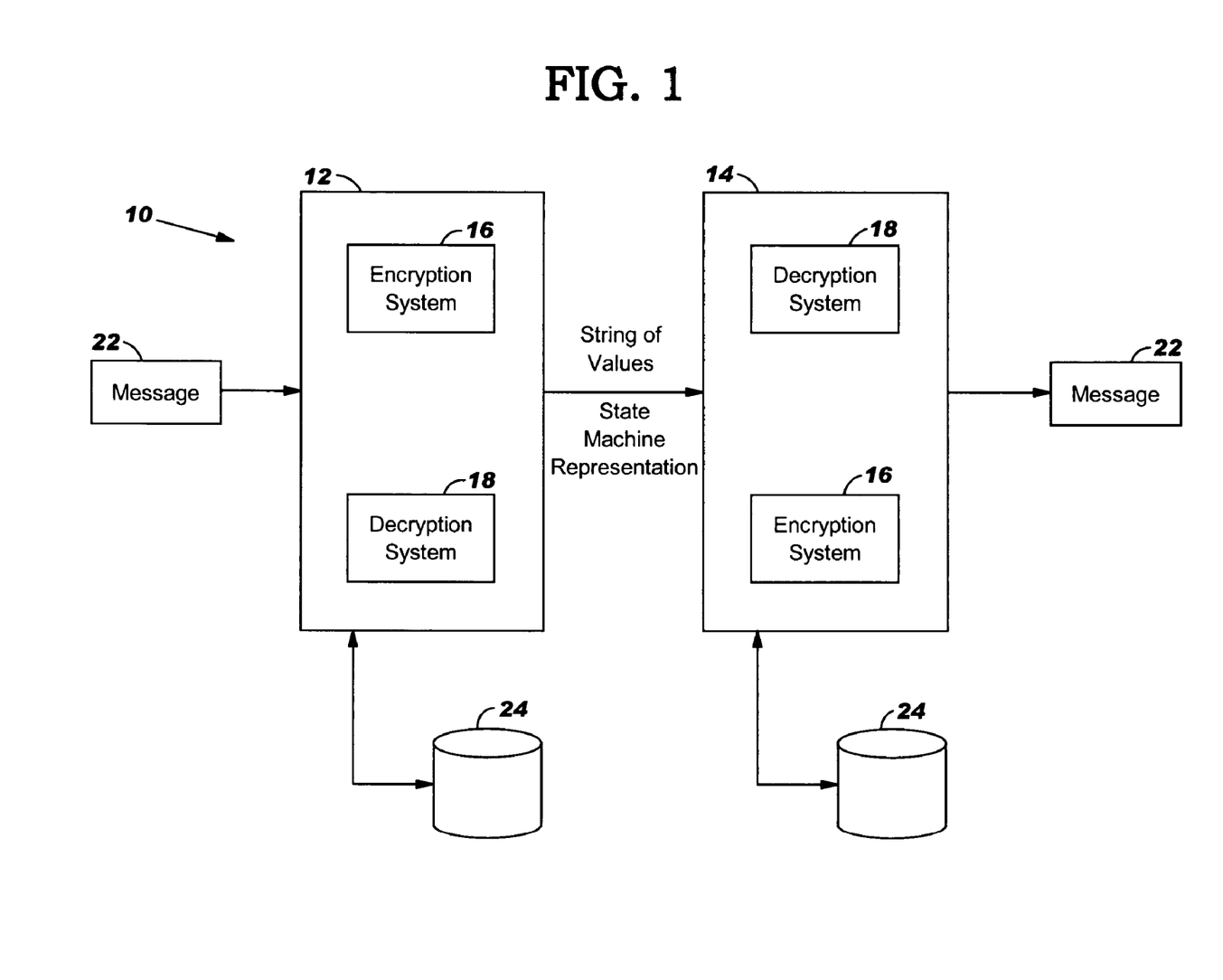
FIG. 1 depicts an encryption/decryption system according to the present invention.

Referring now to FIG. 1, system 10 for encrypting/decrypting a set of data values (i.e., message 22) is shown. As depicted, system 10 includes source system 12 and destination system 14. As will be further described below, source system 12 and destination system 14 are intended to represent any individual, entity or system that has access to a state machine representation for encrypting/decrypting message 22 of data values. In a typical embodiment, source system 12 and destination system 14 are computerized systems that communicate over a network.

Under the present invention, message 22 is encrypted/decrypted using a state machine representation that both source system 12 and destination system 14 can access. As will be further described below in conjunction with FIG. 3, under the present invention, the state machine representation includes a plurality of interconnected nodes that are grouped into (distinct) color segments. The grouping is done such that no two directly connected nodes are grouped into the same color segment. The state machine representation can then be transported between source system 12 and destination system 14 as separate color segments. After being received, the state machine representation could be stored locally on source system 12 and destination system 14 in storage units 24. As shown, source system 12 and destination system 14 each include encryption system 16 as well as decryption system 18. It should be appreciated that source system 12 and destination system 14 are shown to include both encryption system 16 and decryption system 18 to illustrate that data values could be communicated in either direction therebetween. Moreover, as will be further discussed below, encryption system 16 and decryption system 18 are shown as separate systems for illustrative purposes only. Thus, it should be understood that encryption system 16 and decryption system 18 systems could be combined into a single encryption/decryption system.

Figure 2:
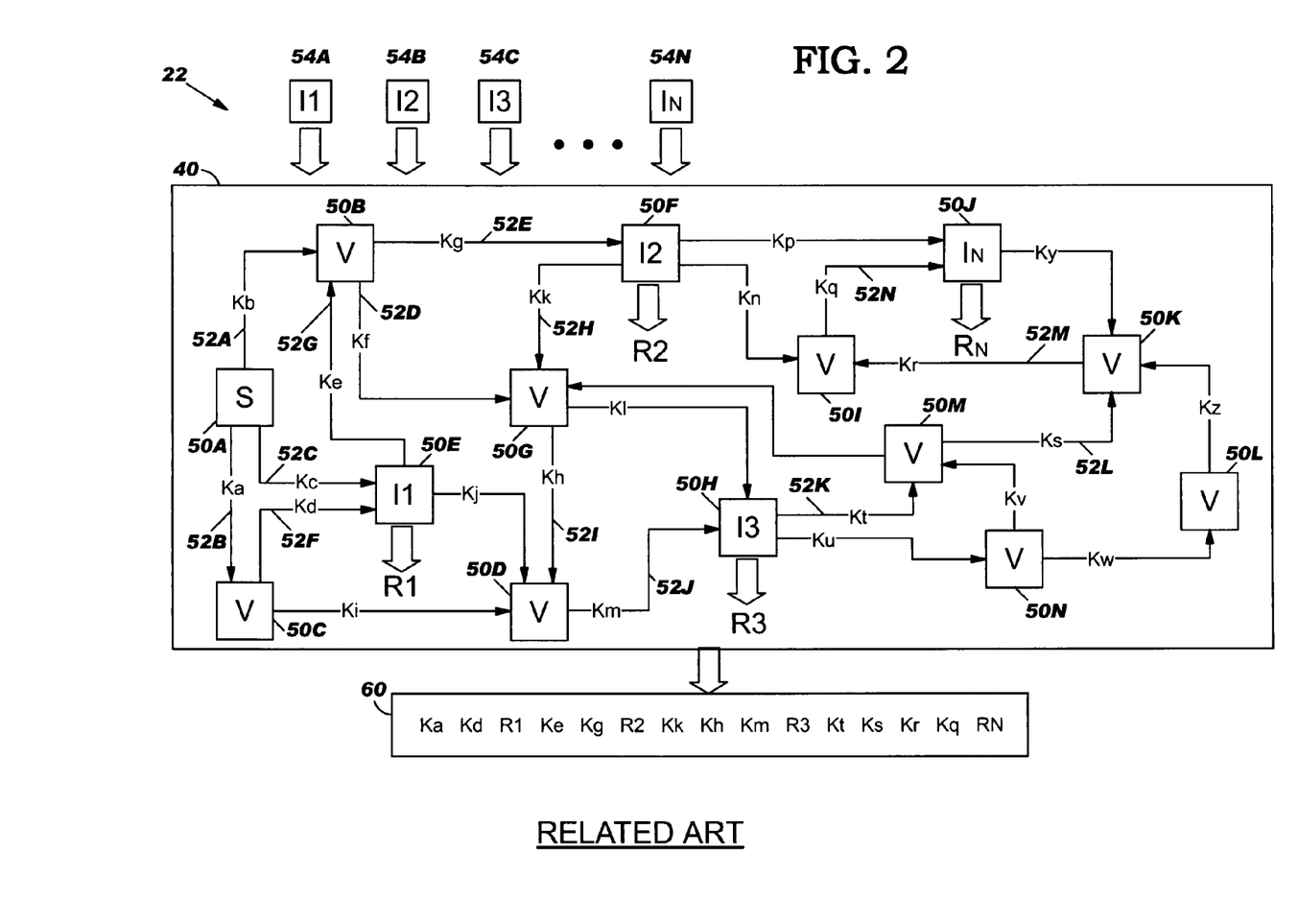
FIG. 2 depicts a related art state machine representation.

Referring now to FIG. 2, an illustrative related art state machine representation 40 is shown. State machine representation 40 is described in the above-incorporated patent application. As depicted, state machine representation 40 includes nodes 50A-N. Each node 50A-N has at least one transitional vector (interconnection) that leads to one of the other nodes 50A-N. For example, node 50A has transitional vectors 52A-C. Similarly node 50B has transitional vectors 52D-E. It should be appreciated that many transitional vectors in FIG. 2 have not been labeled with reference numerals for clarity of illustration purposes only. As further shown, each of the transitional vectors 50A-N has a unique values assigned thereto. For example, transitional vector 52A has the unique value Kb, while transitional vector 52B has been assigned the unique value Ka. To this extent, it can be seen that no two transitional vectors from a single node have been assigned the same unique value. To this extent, the quantity of possible transitional vectors for each node 50A-N is limited only by the number of bits (B) in the unique values. Specifically, each node 50A-N can have $2^B$ transitional vectors. Accordingly, if each unique value has 8 bits, each node 50A-N can have up to 256 transitional vectors. It should be appreciated that state machine representation 40 depicted in FIG. 2 is intended to be illustrative only, and other more complex variations (e.g., 3-dimensional) could be implemented.

To encrypt message 22 using state machine representation 40, data values 54A-N of message 22 are assigned to one or more nodes 50A-N (e.g., by encryption system 16 of FIG. 1). In a typical embodiment, there are more nodes 50A-N than data values 54A-N. Accordingly, it is possible for one or more nodes 50A-N not to be assigned one of data values 54A-N. Moreover, it is possible for a node to be assigned more than one data value (i.e., each node 50A-N is assigned zero or more data values 54A-N). As can be seen in FIG. 2, data values 54A-N have been assigned to nodes 50E, 50F, 50H, and 50J, respectively. Nodes that have not been assigned data values can be assigned non-data values V.

Once data values 54A-N have been assigned to nodes, encryption system 16 will select a start node (S). In this example, the start node (S) is node 50A. Once selected, encryption system 16 will traverse any path of transitional vectors from node to node. It should be appreciated that the path followed for encryption could be any randomly selected path through state machine representation 40. Alternatively, the path followed could be the shortest path necessary to encounter/reach all data values 54A-N. In any event, as the transitional vectors are being traversed, the unique values corresponding thereto will be recorded in sequence. When one of data values 54A-N is encountered/reached at a node, encryption system 16 will generate a random value (e.g., a random number) that is not representative of the transitional vectors or the unique values. This random value will then be recorded in sequence with the unique values. The process will continue until all of data values 54A-N have been encountered/reached.

Once traversal is complete, string of values 60 representing all of the unique values and random values recorded in sequence during encryption will be assembled. String of values 60 illustrates the path that was followed during encryption of message 22. For example, for string of values 60 shown, the following path was followed, and values recorded:

From node 50A to node 50C along transitional vector 52B recording unique value Ka.

From node 50C to node 50E along transition vector 52F recording unique value Kd.

At node 50E, random number R1 was generated and recorded.

From node 50E to node 50B along transitional vector 52G recording unique value Ke.

From node 50B to node 50F along transitional vector 52E recording unique value Kg.

At node 50F, random number R2 was generated and recorded.

From node 50F to node 50G along transitional vector 52H recording unique value Kk.

From node 50G to node 50D along transitional vector 52I recording unique value Kh.

From node 50D to node 50H along transitional vector 52J recording unique value Km.

At node 50H, random number R3 was generated and recorded.

From node 50H to node 50M along transitional vector 52K recording unique value Kt.

From node 50M to node 50K along transitional vector 52L recording unique value Ks.

From node 50K to node 50I along transitional vector 52M recording unique value Kr.

From node 50I to node 50J along transitional vector 52N recording unique value Kq.

At node 50J, random number R4 was generated and recorded.

Thus, as can be seen, string of values 60 provides the precise path that was followed through state machine representation 40. It also indicates which nodes had been assigned data values 54A-N. In addition, string of values 40 shows that there is no necessary interrelationship between unique values and random values. Specifically, each random value (R) in string of values 60 can be preceded or followed by any quantity of unique values. This helps prevent both the quantity of data values 54A-N and the path through state machine representation 40 from being determined.

Once assembled, string of values 60 would be transmitted to destination system 14 along with state machine representation 40, where decryption system 18 will use the sequence of unique values and random values to recover data values 54A-N from state machine representation 40. Specifically, decryption system 18 will follow the path of transitional vectors that correspond to the unique values in string of values 60. When destination system 18 reaches a random value in string of values 60, it is "alerted" that a data value must be present at that node. For example, after destination system follows transitional vectors 52B and 52F to node 50E (according to unique values Ka and Kd), the next value in string of values is random value R1. This informs destination system 18 that a data value (i.e., data value 54A) is present at node 50E. In response, destination system 18 will recover data value 54A. If a random value is out of sequence in string of values 60, decryption system 18 would recover a non-data value V, which would not lead to an accurate recovery of message 22.

As indicated above, transporting state machine representation 40 between source system 12 and destination system 14 poses various security risks. Specifically, an intruder could intercept state machine representation 40. If this occurs, any intercepted strings of values could be decrypted to reveal the underlying messages. Accordingly, the present invention provides an improved, protected state machine representation.

Figure 3:
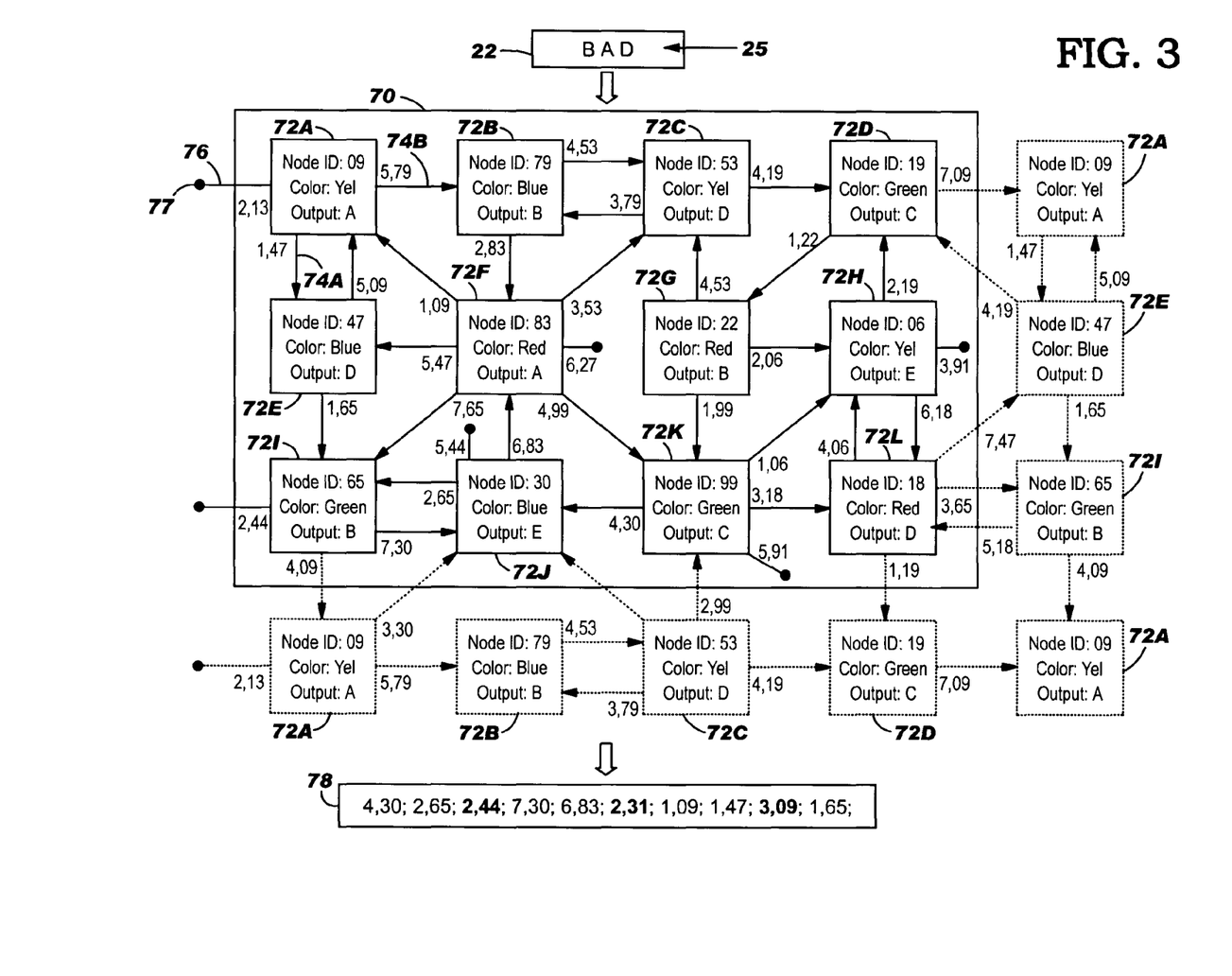
FIG. 3 depicts a protected state machine representation according to the present invention

Referring now to FIG. 3, a state machine representation 70 according to the present invention is depicted. As shown, state machine representation 70 includes a plurality of nodes (e.g., $2^B$) 72A-L. To indicate possible wrap-around, the nodes on the bottom row (in phantom) are duplicates of the top row, and the nodes in the right column (in phantom) are duplicates of the left column. Each node 72A-L is assigned a unique node identifier and an output value. For example, node 72A has the unique node identifier "09" and the output value "A." The output values generally represent possible data values in message 22. That is, set of data values 25 in message 22 are generally assigned to one or more nodes 72A-L in state machine representation 70. To this extent, it is not necessary for the nodes 72A-L to only be assigned data values in message 22. Rather, one or more of the nodes (e.g., node 72D) could be assigned a data value that is not in message 22. As further shown, the plurality of nodes 72A-L are interconnected by transitional vectors (e.g., transitional vectors 74A-B). It should be understood that all transitional vectors have not been labeled with reference numerals so that FIG. 3 can remain clear. Each transitional vector has a corresponding unique value. For example transitional vector 74A has the unique value of "1.47" while transitional vector 74B has the unique value "5.79." To this extent, it can be seen that in a typical embodiment, each unique value has two parts. The first part represents an arbitrary value, while the second part represents the unique node identifier to which the corresponding transitional vector leads. For example, unique value "5.79" leads to node 72B with a unique node identifier of "79." As further shown in FIG. 3, in addition to be connected to other nodes, certain nodes are also connected to termination points. For example, node 72A is connected to termination point 77 by a "termination" type of transitional vector 76 herein after referred to as a termination vector.

In any event, under the present invention, the nodes of state machine representation 70 are grouped into distinct color segments so that no two directly connected nodes are grouped in the same color segment. For example, node 72A is in the yellow color segment, while node 72B is in the blue color segment. Segmenting state machine representation 70 in this manner allows it to be transported between source system 12 and destination system 14 in segments instead of as a whole. Unless a party has the entire state machine representation 70, he/she will not be able to decrypt message 22. Listed below is a table showing the grouping of state machine representation 70 as well as the transition between nodes 72A-L.

| Segment Color | Node ID | Output Value | State Transitions |
|---|---|---|---|
| Yellow | 9 | A | 1,47; 2,13; 5,79 |
|  | 53 | D | 2,99; 3,79; 4,19; 7,30 |
|  | 6 | E | 2,19; 3,91; 6,18 |
| Blue | 79 | B | 2,83; 4,53 |
|  | 47 | D | 1,65; 4,19; 5,09 |
|  | 30 | E | 2,66; 5,44; 6,83 |
| Green | 19 | C | 1,22; 7,09 |
|  | 65 | B | 2,44; 4,09; 5,18; 7,30 |
|  | 99 | C | 1,06; 3,18; 4,30; 5,91 |
| Red | 83 | A | 1,09; 3,53; 4,99; 5,47; 6,27; 7,65 |
|  | 22 | B | 1,99; 2,06; 4,53 |
|  | 18 | D | 1,19; 3,65; 4,06; 7,47 |

To encrypt set of data values 25, a starting node will be selected. For example, for the set of data values "BAD" shown in FIG. 3, assume that the node 72K is selected as the staring node. The plurality of nodes will then be randomly traversed, and the unique values corresponding thereto will be recorded in sequence. When a node having an output value that matches one of the data values is reached (i.e., a "current" node), an invalid unique value is designated and recorded. An individual unique value can be that which corresponds to a nonexistent transitional vector from the node, or which corresponds to a termination vector leading to a termination point (e.g., termination vector 76). When, the set of data values 25 is encrypted, string of values 78 that includes the unique values and invalid unique values as recorded in sequence will be output.

Based on set of data values 25 shown in FIG. 3, one of many paths that can be followed though state machine representation 70 starting from node 72K is as follows: "4.30; 2.65; 2.44; 7.30; 6.83; 2.31; 1.09; 1.47; 3.09; 1.65." Specifically, beginning with node 72K, a "4.30" will lead to node 72J and a "2.65" will lead to node 72I. Once at node 72I, it can be seen that the output value thereof matches the first data value in string of data values 25 (i.e., "B"). Accordingly an invalid unique value can be designated and recorded to represent the presence of the data value. Since a "2.44" corresponds to a termination vector leading from node 72I to a termination point, a "2.44" it would be considered an invalid unique value for node 72I. After this "2.44" is recorded, a "7.30" would lead from node 72I to node 72J, and a "6.83" would lead from node 72J to node 72F. At node 72F, it can be seen that the output value thereof matches the second data value in string of data values (i.e., "A"). Thus, another invalid unique value can be designated and recorded. Since a unique value of "2.31" does not correspond to any transitional vectors leading from node ID 72F, a "2.31" would be considered an invalid unique value for node 72F. After the "2.31" is recorded, a "1.09" would lead from node 72F to node 72A, and a "1.47" would lead from node 72A to node 72E. Once at node 72E, it can be seen that the output value thereof matches the final data value in set of data values (i.e., "D"). Therefore, another invalid unique value can be designated and recorded. Since there are no transitional vectors leading from node 72E that have the unique value of "3.09", a "3.09" would be considered an invalid unique value. After recording the "3.09" the process can end, or the traversal can continue while the additional unique values are recorded in sequence. For example, a subsequent "1.65" would lead from node 72E to node 72I.

Once the unique values and invalid unique values have been recorded in sequence, they can be transported to destination system 14 as string of values 78. Further, the various color segments of state machine representation 70 can be separately transported. Typically, the segments are transported over separate channels. Even if an intruder obtains one segment of state machine representation, he/she is faced with a list of candidate strings that will not generate the correct string. This is especially the case since no two directly connected nodes are included in the same segment. For example, if an intruder possesses the red segment, he/she only has possession of nodes 72F, 72G and 72L. As such, the intruder has no idea whether a value of "6.27" from node 72F leads to a termination point or to another node, much less to which node since it is guaranteed that the node is either a termination point/invalid node, or is a valid node in a color segment other than red. The number of possible values to be generated is on the order of $n^p$ where n is the average number of transitions per node and p is the length of the encrypted string. Shown below are the possible state transitions for an intruder who has intercepted both the red segment and the string of values "4.30; 2.65; 2.44; 7.30; 6.83; 2.31; 1.09; 1.47; 3.09; 1.65."

| String of Values | Actual Decrypted Value | Candidate Node in Red Segment | Candidate Invalid Output Values |
|---|---|---|---|
| 4, 30 |  | 99, 53, 06 |  |
| 2, 65 |  | 6 | A, D |
| 2, 44 | B | 6 | A, D |
| 7, 30 |  | 65, 47 | B |
| 6, 83 |  | 27 | D, D |
| 2, 31 | A | 6 | A, D |
| 1, 09 |  | 09, 19, 99 |  |
| 1, 47 |  | 09, 19, 99 |  |
| 3, 09 | D | 53, 65 | B |
| 1, 65 |  | 09, 19, 99 |  |

Based on the illustrative example, an intruder has approximately 2,107,200 possible permutations of traversal paths to analyze.

Figure 4:
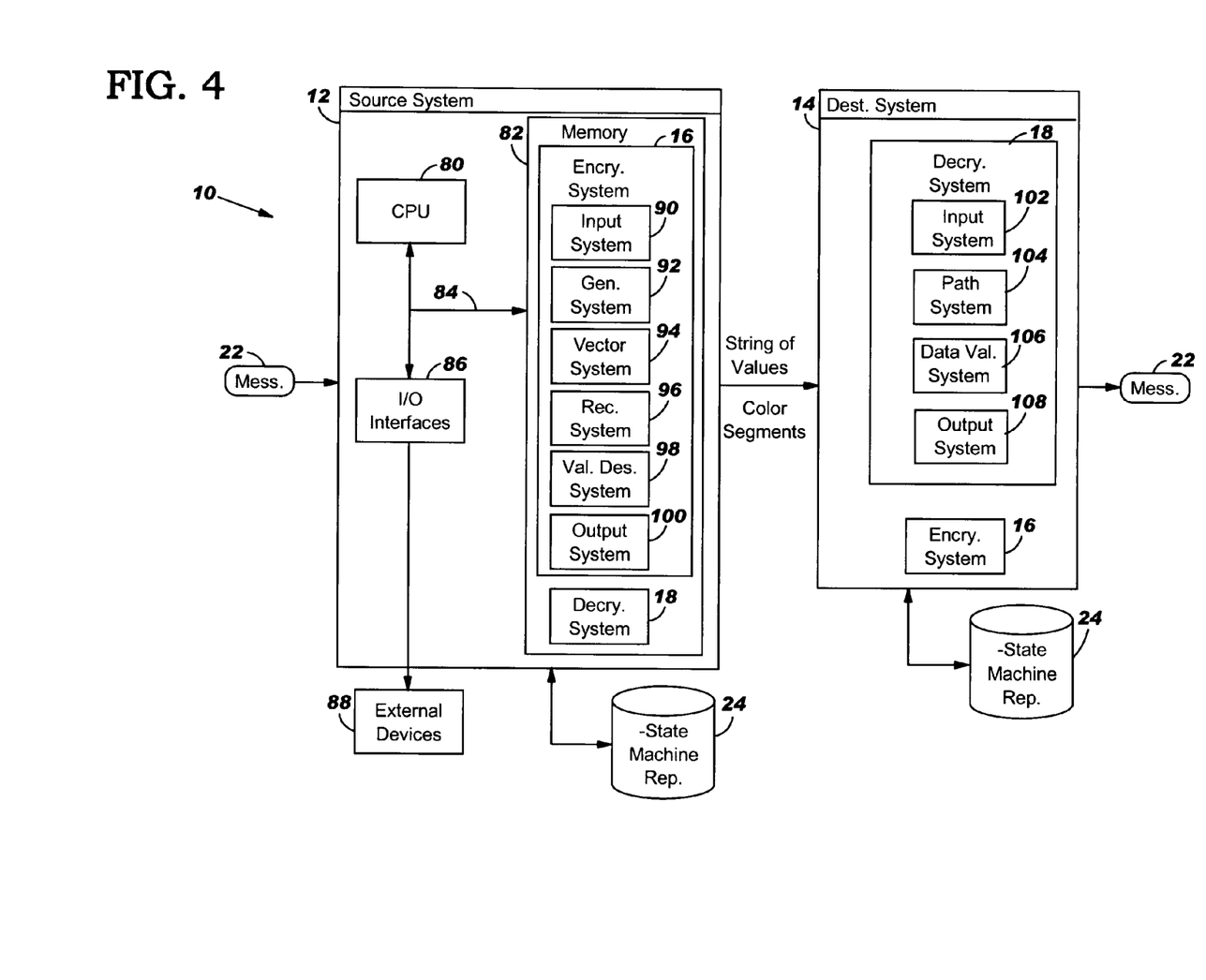
FIG. 4 depicts a more detailed diagram of the system of FIG. 1.

Referring now to FIG. 4, a more detailed diagram of system 10 of FIG. 1 is shown. In FIG. 4 source system 12 and destination system 14 are computerized systems. Such systems can be any type of computerized system that can send and receive information (i.e., a string of values). Examples include, among others, personal computers, workstations, personal digital assistants, etc. However, as indicated above, it should be understood that the teachings described herein could be performed manually (e.g., by individuals or entities) without the use of computerized systems. As shown, source system 12 generally comprises central processing unit (CPU) 80, memory 82, bus 84, input/output (I/O) interfaces 86 and external devices/resources 88. CPU 80 may comprise a single processing unit, or be distributed across one or more processing units in one or more locations, e.g., on a client and server. Memory 82 may comprise any known type of data storage and/or transmission media, including magnetic media, optical media, random access memory (RAM), read-only memory (ROM), a data cache, a data object, etc. Moreover, similar to CPU 80, memory 82 may reside at a single physical location, comprising one or more types of data storage, or be distributed across a plurality of physical systems in various forms.

I/O interfaces 86 may comprise any system for exchanging information to/from an external source. External devices/resources 88 may comprise any known type of external device, including speakers, a CRT, LED screen, hand-held device, keyboard, mouse, voice recognition system, speech output system, printer, monitor, facsimile, pager, etc. Bus 84 provides a communication link between each of the components in source system 12 and likewise may comprise any known type of transmission link, including electrical, optical, wireless, etc. In addition, although not shown, additional components, such as cache memory, communication systems, system software, etc., may be incorporated into source system 12.

It should be understood that although not shown for brevity purposes, destination system 14 typically includes computerized components (e.g., CPU, memory, bus, I/O interfaces, external devices, etc.) similar to source system 12. It should also be understood that communication between source system 12 and destination system 14 can occur via a direct hardwired connection (e.g., serial port), or via an addressable connection in a client-server (or server-server) environment which may utilize any combination of wireline and/or wireless transmission methods. In the case of the latter, the server (not shown in FIG. 4) and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server Storage units 24 are optional and could provide storage for information such as, for example, state machine representation 70, string of values 25, etc. As such, storage units 24 may include one or more storage devices, such as a magnetic disk drive or an optical disk drive. In another embodiment, storage units 24 include data distributed across, for example, a local area network (LAN), wide area network (WAN) or a storage area network (SAN) (not shown). Storage units 24 may also be configured in such a way that one of ordinary skill in the art may interpret them to include one or more storage devices.

Shown in memory 82 of source system (as program products) are encryption system 16 and decryption system 18. It should be understood that systems 16 and 18 are separately shown for illustrative purposes only, and that systems 16 and 18 could be combined into a single encryption/decryption system. As indicated above, message 22 having set of data values 25 (FIG. 3) is encrypted by traversing a path though state machine representation 70, recording in sequence the unique values for the transitional vectors traversed. When a node is reached (i.e., a current node) that has an output value matching one of the data values in set of data values 25, an invalid unique value is designated and recorded. Under the present invention, state machine representation 70 can be pre-generated and provided in separate color segments to source system 12 via input system 90. Alternatively, state machine representation 70 can be created via generation system 92. In the case of the latter, source system 12 can utilize a template to create state machine representation 70, group the resulting nodes into color segments, and assign set of data values 25 in message 22 to one or more of the nodes thereof.

In any event, state machine representation 70 is provided to source system 12, vector system 94 will select a start node and begin traversing transitional vectors from node to node. As indicated above, any path of transitional vectors can be followed. To this extent, vector system 94 could include a random number generator for randomly traversing the nodes. As the transitional vectors are being traversed, the unique values assigned thereto will be recorded in sequence by recording system 96. When a node is reached that has an output value matching one of the data values, value designation system 98 will designate an invalid unique value. As indicated above, an invalid unique value can be that which corresponds to a non-existing transitional vector for the current node, or that corresponds to a termination vector leading from the current node to a termination point. In either event, recording system 96 will record the invalid unique values in sequence with the unique values. Once all data values in message 22 have been encrypted, output system will transport string of values 78 (FIG. 3) that includes the recorded sequence of unique values and invalid unique values to destination system 14. Output system 100 will also separately transport the color segments of state machine representation 70 to destination system 14.

Upon receipt of string of values 70, decryption system 18 will follow the path according to string of values 78 (FIG. 3) and decrypt message 22. Specifically, as shown, decryption system 18 includes input system 102, path system 104, data value system 106 and output system 108. String of values 78 and the separate color segments of state machine representation 70 are received by input system 102. Path system 104 will reassemble state machine representation 70 and then follow the path used to encrypt message 22 based on string of values 78. In reassembling state machine representation 70, destination system 14 must receive all color segments thereof. Further, path system 104 could utilize a template in reassembling the color segments to arrive at state machine representation 70. If the color segments are not assembled correctly, decryption system 18 will not be able to decrypt the message. In, any event, once state machine representation 70 is reassembled, path system 104 will traverse the sequence of transitional vectors corresponding to the unique values in string of values 78. If an invalid unique value is encountered in string of values 78, data value system 106 will recover a data value by reading the output value from the current node. For example, if after reaching 72I (FIG. 3) path system 104 encounters a value of "2.44" an invalid unique value will be recognized. Accordingly, data value system 106 will read data value "B" from node 72I. Path system 104 will then continue to traverse the transitional vectors that correspond to the unique values in string of values 78 until all data values have been recovered. Once all data values have been recovered, output system 108 can then output message 22. As can be seen it is important for all unique values and invalid unique values to be recorded in their proper sequence. If one or more of the values are recorded out of sequence, message 22 might not be recovered.

As indicated above, it should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. An encryption state machine representation stored on a recordable medium for use by a computerized message encryption system, comprising:
    a plurality of nodes grouped into color segments, wherein directly connected nodes of the plurality of nodes are grouped into different color segments;
    a set of transition vectors for interconnecting the plurality of nodes, wherein each of the set of transition vectors is assigned a unique value and leads from one of the plurality of nodes to another one of the plurality of nodes, wherein each of the plurality of nodes has at least one of the set of transitional vectors; and
    a set of termination vectors, wherein each of the set of termination vectors interconnects one of the plurality of nodes with a termination point.

2. The encryption state machine representation of claim 1, wherein each of the plurality of nodes is assigned a unique node identifier and an output value.

3. The encryption state machine representation of claim 2, wherein the output values represent possible data values.

4. A method for securing an encryption state machine representation for use by a computerized message encryption system, comprising:
    providing an encryption state machine representation having a plurality of nodes, wherein each of the plurality of nodes has at least one transition vector that has a unique value and that leads to another one of the plurality of nodes, and wherein the encryption state machine representation further includes a set of termination vectors that each lead from one of the plurality of nodes to a termination point;
    grouping the plurality of nodes into color segments; and
    using the encryption machine to at least one of encrypt or decrypt a set of data values.

5. The method of claim 4, further comprising separately transporting the color segments.

6. The method of claim 4, wherein each of the plurality of nodes is assigned a unique node identifier and an output value.

7. The method of claim 4, wherein directly connected nodes of the plurality of nodes are grouped into different color segments.

8. A method for encrypting a set of data values for use by a computerized message encryption system, comprising:
    providing a state machine representation having a plurality of nodes grouped into color segments, wherein each of the plurality of nodes is assigned a unique node identifier and an output value, and wherein each of the plurality of nodes has at least one transition vector having a unique value that leads to another one of the plurality of nodes;
    selecting a starting node and traversing along the transition vectors, recording in sequence, the unique values for the transition vectors traversed; and
    recording an invalid unique value upon reaching one of the plurality of nodes having an output value that matches one of the set of data values; and
    outputting the recorded unique values and the recorded invalid unique values as a string of values.

9. The method of claim 8, wherein the providing step comprises assigning each of the set of data values to at least one of the plurality of nodes as an output value.

10. The method of claim 8, wherein the invalid unique value corresponds to a transition vector that does not exist from the one of the plurality of nodes.

11. The method of claim 8, wherein the invalid unique value corresponds to a termination vector that leads from the one of the plurality of nodes to a termination point.

12. The method of claim 8, further comprising:
    separately outputting the color segments of the state machine representation.

13. The method of claim 12, further comprising decrypting the set of data values, wherein the decrypting step comprises:
    receiving the string of values;
    separately receiving the color segments of the state machine representation;
    selecting the starting node and traversing along the transition vectors traversed during encryption of the set of data values according to the unique values in the string of values; and
    recovering one of the set of data values by reading the output value from a current node when one of the invalid unique values is reached in the string of values.

14. The method of claim 8, wherein the transition vectors are randomly traversed.

15. A method for decrypting a set of data values for use by a computerized message encryption system, comprising:
    receiving a state machine representation having a plurality of nodes grouped into color segments, wherein each of the plurality of nodes is assigned a unique node identifier and an output value, and wherein each of the plurality of nodes has at least one transition vector having a unique value that leads to another one of the plurality of nodes;
    receiving a string of values that includes unique values and invalid unique values as recorded in sequence during encryption of the set of data values;
    selecting a starting node and traversing along the transition vectors according to the unique values in the string of values; and
    recovering one of the set of data values by reading the output value from a current node when one of the invalid unique values is reached in the string of values.

16. The method of claim 15, wherein the color segments of the state machine are separately received.

17. The method of claim 15, wherein directly connected nodes of the plurality of nodes are grouped into different color segments.

18. The method of claim 15, wherein each of the set of data values is assigned to at least one of the plurality of nodes as an output value.

19. The method of claim 15, wherein the one invalid unique value corresponds to a transition vector that does not exist from the current node.

20. The method of claim 15, wherein the one invalid unique value corresponds to a termination vector that leads from the current node to a termination point.

21. A computer implemented system for encrypting a set of data values, comprising:

a vector system for traversing along a set of transition vectors between a plurality of nodes in a state machine representation, wherein the plurality of nodes are grouped into color segments, wherein each of the plurality of nodes is assigned a unique node identifier and an output value, and wherein each of the set of transition vectors has a unique value;

a recording system for recording in sequence the unique values corresponding to the set of transition vectors traversed;

a value designation system for providing an invalid unique value when one of the plurality of nodes is reached that has an output value matching one of the set of data values, wherein the recording system further records the invalid unique values in sequence with the unique values; and an output system for outputting a string of values that includes the unique values and the invalid unique values as recorded in sequence.

22. The system of claim 21, wherein the output system further outputs the color segments of the state machine representation.

23. The system of claim 21, wherein the invalid unique value corresponds to a transition vector that does not exist from the one of the plurality of nodes.

24. The system of claim 21, wherein the invalid unique value corresponds to a termination vector that leads from the one of the plurality of nodes to a termination point.

25. The system of claim 21, wherein the set of transition vectors are randomly traversed.

26. The system of claim 21, wherein each of the set of data values is assigned to at least one of the plurality of nodes as an output value.

27. A computer implemented system for decrypting a set of data values, comprising:
an input system for receiving a string of values that includes unique values and invalid unique values as recorded in sequence during encryption of the set of data values, and for receiving a state machine representation having a plurality of nodes grouped into color segments, wherein each of the plurality of nodes is assigned a unique node identifier and an output value, and wherein each of the plurality of nodes has at least one transition vector having a unique value that leads to another one of the plurality of nodes;
a path system for traversing a set of the transition vectors according to the string of values; and
a data value system for recovering one of the set of data values by reading the output from a current node when one of the invalid unique values in the string of values is reached.

28. The system of claim 27, wherein the color segments of the state machine representation are separately received.

29. The system of claim 27, wherein the one invalid unique value corresponds to a transition vector that does not exist from the current node.

30. The system of claim 27, wherein the on invalid unique value corresponds to a termination vector that leads from the current node to a termination point.

31. The system of claim 27, wherein each of the set of data values is assigned to at least one of the plurality of nodes as an output value.

32. A program product stored on a recordable medium for encrypting a set of data values for use by a computerized message encryption system, which when executed, comprises:

program code for traversing along a set of transition vectors between a plurality of nodes in a state machine representation, wherein the plurality of nodes are grouped into color segments, wherein each of the plurality of nodes is assigned a unique node identifier and an output value, and wherein each of the set of transition vectors has a unique value;

program code for recording in sequence the unique values corresponding to the set of transition vectors traversed;

program code for providing an invalid unique value when one of the plurality of nodes is reached that has an output value matching one of the set of data values, wherein the program code for recording further records the invalid unique values in sequence with the unique values; and program code for outputting a string of values that includes the unique values and the invalid unique values as recorded in sequence.

33. The program product of claim 32, wherein the program code for outputting further outputs the color segments of the state machine representation.

34. The program product of claim 32, wherein the invalid unique value corresponds to a transition vector that does not exist from the one of the plurality of nodes.

35. The program product of claim 32, wherein the invalid unique value corresponds to a termination vector that leads from the one of the plurality of nodes to a termination point.

36. The program product of claim 32, wherein the set of transition vectors are randomly traversed.

37. The program product of claim 32, wherein each of the set of data values is assigned to at least one of the plurality of nodes as an output value.

38. A program product stored on a recordable medium for decrypting a set of data values for use by a computerized message encryption system, which when executed, comprises:
program code for receiving a string of values that includes unique values and invalid unique values as recorded in sequence during encryption of the set of data values, and for receiving a state machine representation having a plurality of nodes grouped into color segments, wherein each of the plurality of nodes is assigned a unique node identifier and an output value, and wherein each of the plurality of nodes has at least one transition vector having a unique value that leads to another one of the plurality of nodes;
program code for traversing a set of the transition vectors according to the string of values; and
program code for recovering one of the set of data values by reading the output value from a current node when one of the invalid unique values in the string of values is reached.

39. The program product of claim 38, wherein the color segments of the state machine representation are separately received.

40. The program product of claim 38, wherein the one invalid unique value corresponds to a transition vector that does not exist from the current node.

41. The program product of claim 38, wherein the on invalid unique value corresponds to a termination vector that leads from the current node to a termination point.

42. The program product of claim 38, wherein each of the set of data values is assigned to at least one of the plurality of nodes as an output value.

* * * * *